Figure 1:
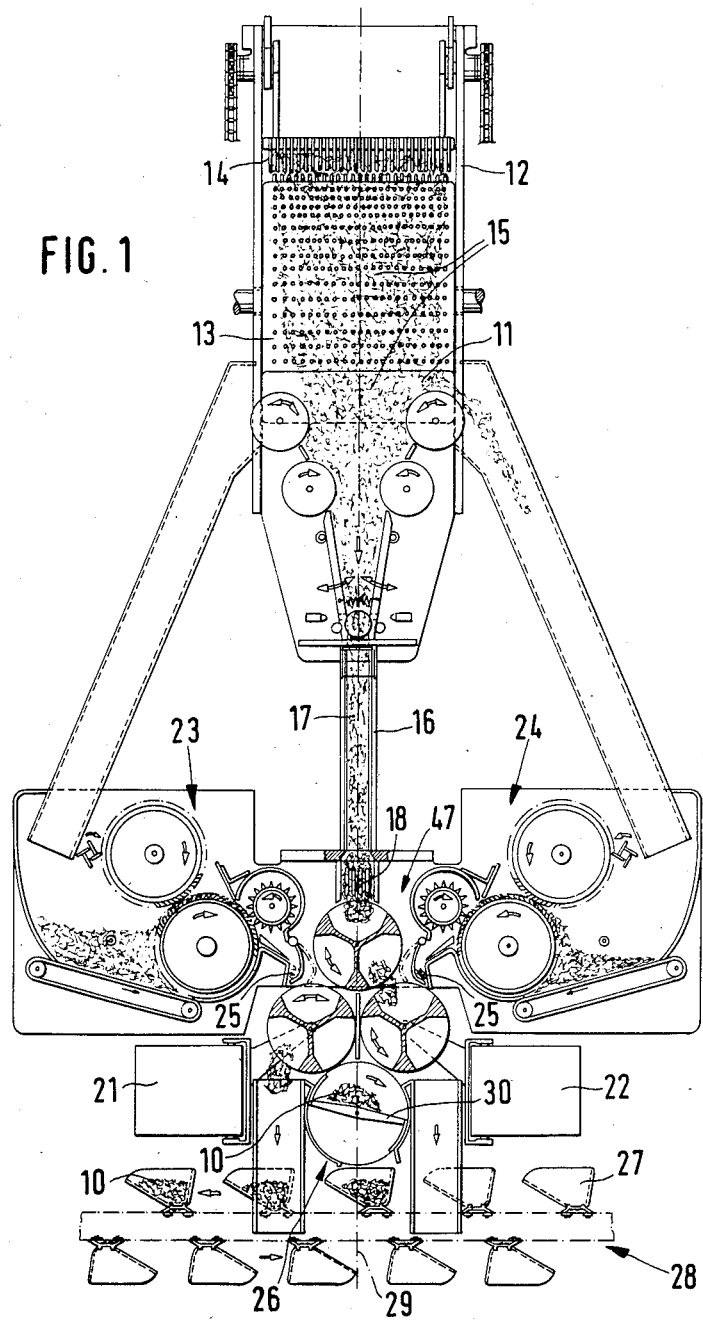

United States Patent [19]

Focke et al.

[11] Patent Number: 4,583,571
[45] Date of Patent: Apr. 22, 1986

[54] APPARATUS FOR FORMING AND TRANSPORTING AWAY TOBACCO PORTIONS

[75] Inventors: Heinz Focke; Oskar Balmer, both of Verden, Fed. Rep. of Germany

[73] Assignee: Focke & Co., Verden, Fed. Rep. of Germany

[21] Appl. No.: 595,158

[22] Filed: Mar. 30, 1984

[30] Foreign Application Priority Data

May 4, 1983 [DE] Fed. Rep. of Germany ....... 3316176

[51] Int. Cl.$^4$ .............................................. B65B 1/04
[52] U.S. Cl. ..................................... 141/83; 131/282
[58] Field of Search ............... 141/83; 131/282, 27 A, 131/27 R, 56, 57, 108, 109 R, 109 B, 110; 177/120, 121, 123; 222/55, 56, 196, 370; 198/537, 601

[56] References Cited

U.S. PATENT DOCUMENTS 4,111,212  9/1978  Bakker .................. 131/21 A
4,284,380  8/1981  Brumbaugh et al. ........... 141/83

Primary Examiner—Houston S. Bell, Jr.
Attorney, Agent, or Firm—Sughrue, Mion, Zinn, Macpeak, and Seas

[57] ABSTRACT

In the packaging of (long-fiber) cut tobacco, individual tobacco portions (10) are formed from a strand of tobacco (17). These are underweight. In the region of a tobacco balance, the difference between the actual weight and the nominal weight is determined and a difference portion (25) is added accordingly. The complete tobacco portion (10) has to be transferred to a discharge conveyor (bucket chain 28). For this purpose, a star feeder rotating synchronously with a bucket mechanism is used as a distributor device (26).

13 Claims, 5 Drawing Figures

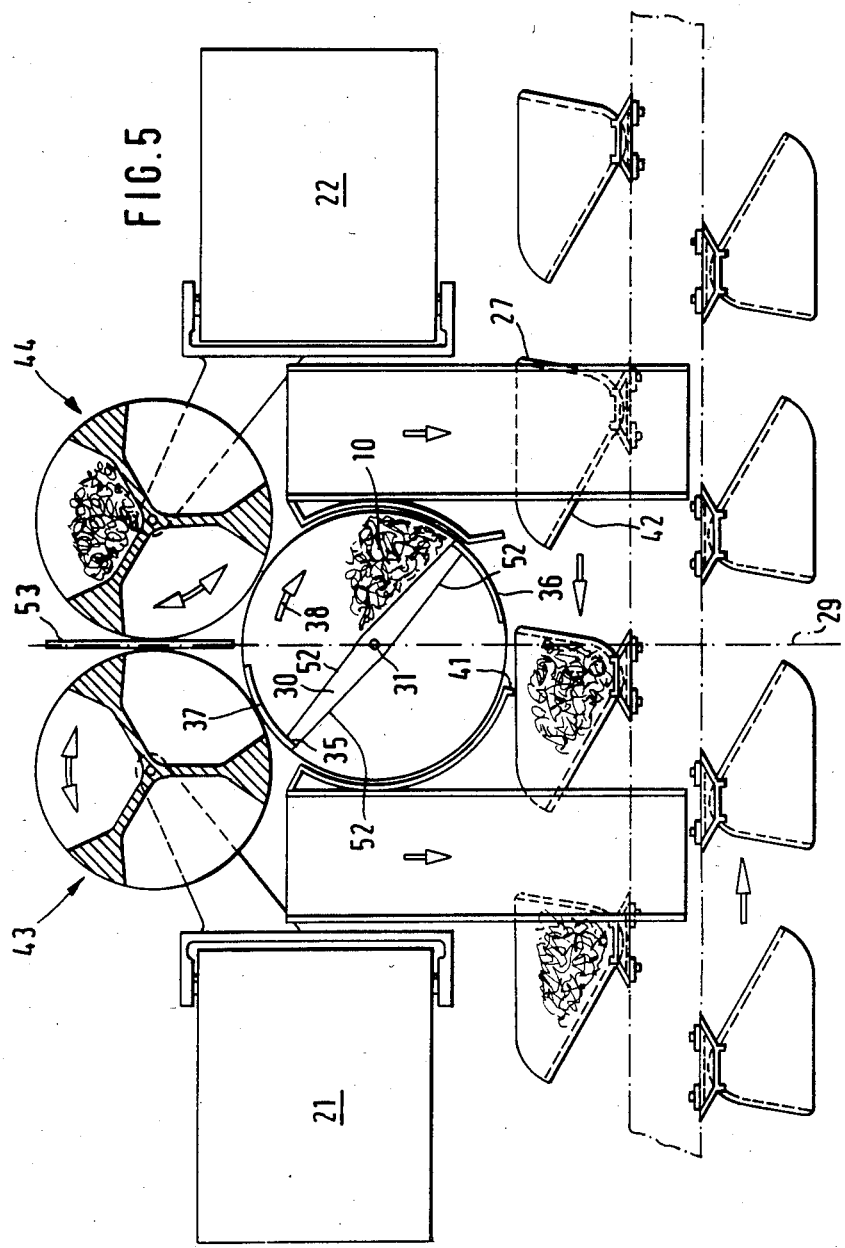

APPARATUS FOR FORMING AND TRANSPORTING AWAY TOBACCO PORTIONS

DESCRIPTION

The invention relates to an apparatus for forming portions of fibrous material, especially cut tobacco, and for transporting them away by means of a conveyor having receptacles, each for one portion, especially by means of a bucket chain, in which apparatus the portions can be fed to the buckets or the like of the conveyor by means of a distributor device located above the conveyor.

In a known apparatus of this type (U.S. Pat. No. 4,111,212), (rough) portions are separated from a strand (conveyed in a downward direction) and are each fed alternately to one of two tobacco balances. The actual weight of the portion, which is slightly below the nominal weight, is determined by means of these. A make-up quantity corresponding to the difference in weight determined is supplied by means of a fine-metering device assigned to each tobacco balance, until the nominal weight is reached. The correctly metered portion is fed, via distributor devices consisting of individual pivotable flaps, to one of the buckets of a bucket chain moving underneath the distributor devices.

The above-mentioned solution regarding the design and mode of operation of the distributor device has not proved very efficient in practice, since the pivotable flaps allow only a limited speed of passage for the portions. Furthermore, because of the frequency of the pivoting movements, flaps of this type are susceptible to faults.

The object on which the invention is to propose an apparatus for distributing and conveying away portions of cut tobacco or the like, in which the portions can be transferred free of faults to a discharge conveyor (bucket chain) at working speed, while at the same time ensuring that the portions are handled carefully.

To achieve this object, the apparatus according to the invention is characterized in that the distributor device has at least one distributor wall rotating synchronously with the bucket chain and intended for receiving one portion at any particular time and transferring it to a bucket after a partial movement of the distributor wall.

According to a preferred embodiment, the distributor device is designed as a star feeder which is rotatably driven to rotate and which has at least one diametrically extending partition wall, in particular the distributor wall, and side walls (in the form of circular surfaces) attached to the end faces of the latter. The distributor wall divides the roller-type or cylinder-type distributor device, designed in this way, into two chambers of approximately semi-circular cross-section. The distributor device or distributor wall is driven to rotate about a central axis of rotation, specifically always in a constant direction of rotation corresponding to the direction of movement of the conveyor. The (linear) conveying movement of the latter and the rotation of the distributor device are coordinated in a fixed relation with one another (synchronous running). Consequently, the conveyor and distributor device or distributor wall are always in a predetermined relative position in relation to one another, in such a way that each portion received by the distributor wall is transferred reliably into a bucket moving past underneath.

The portions are fed to the distributor device from above by being dropped (under their own weight), specifically, alternately from several feed devices, in particular receptacles of tobacco balances. Conventionally, two tobacco balances are assigned to a common distributor device. The tobacco-balance receptacles designed, for example, as star feeders transfer the metered portions alternately to the distributor device by dropping the portion onto the rotating distributor wall.

According to a further proposal of the invention, the latter is provided, on each of the radially outer longitudinal edges, with a retaining wall pointing in the direction of rotation, these being designed as retaining plates in the form of parts of circular arcs. These form, together with the distributor wall and fixed guide surfaces in the form of parts of circular arcs, chambers or spaces for temporarily receiving a portion, the distributor device moreover being open on the radially outer side.

The distributor device according to the invention is characterized by reliability and high productivity, so that up to 80 portions per minute can be transferred perfectly.

Further details of the invention relate to the constructional design of the distributor device, in conjunction with associated devices, and to functional relationships.

Figure 2:
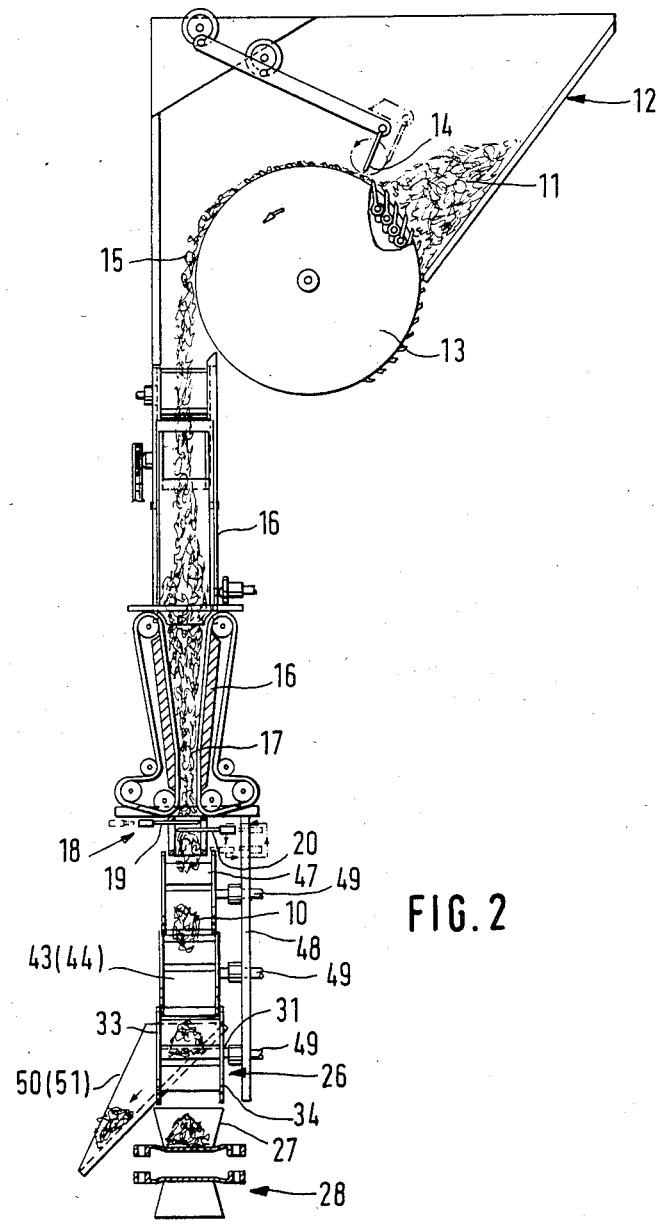
Figure 3:
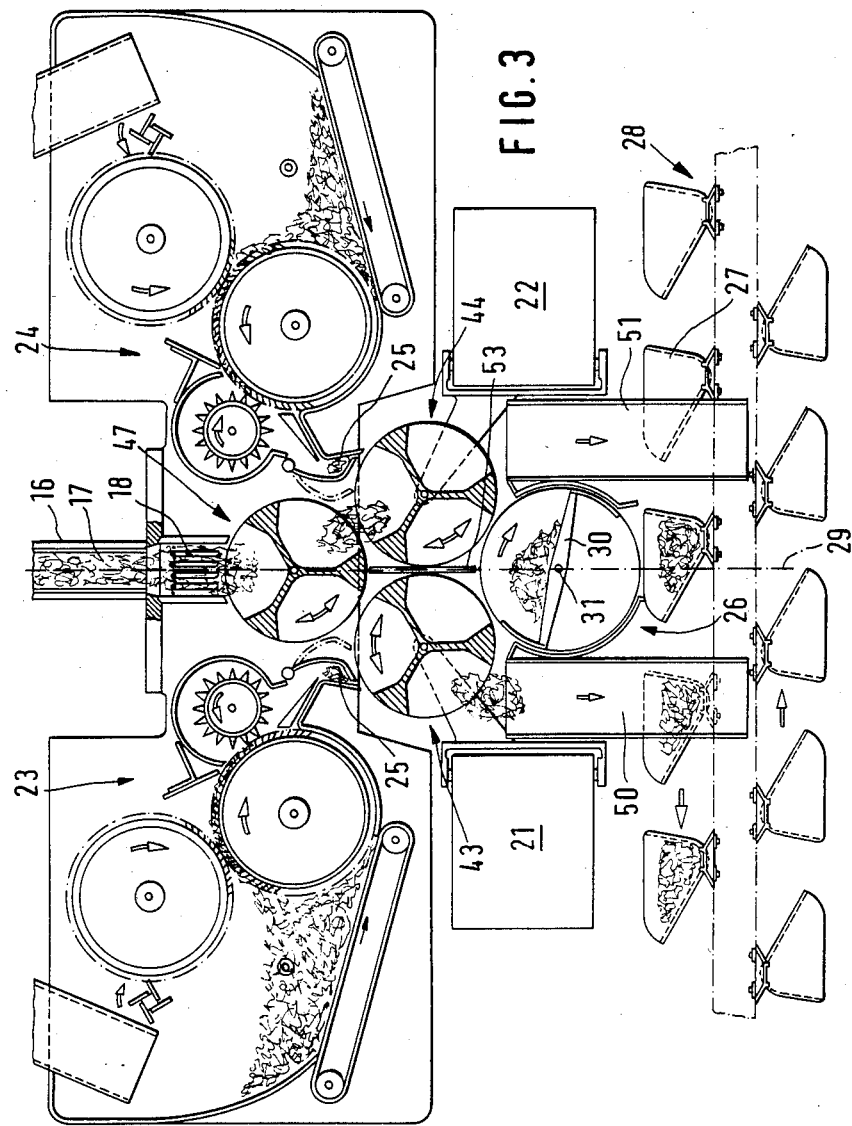
Figure 4:
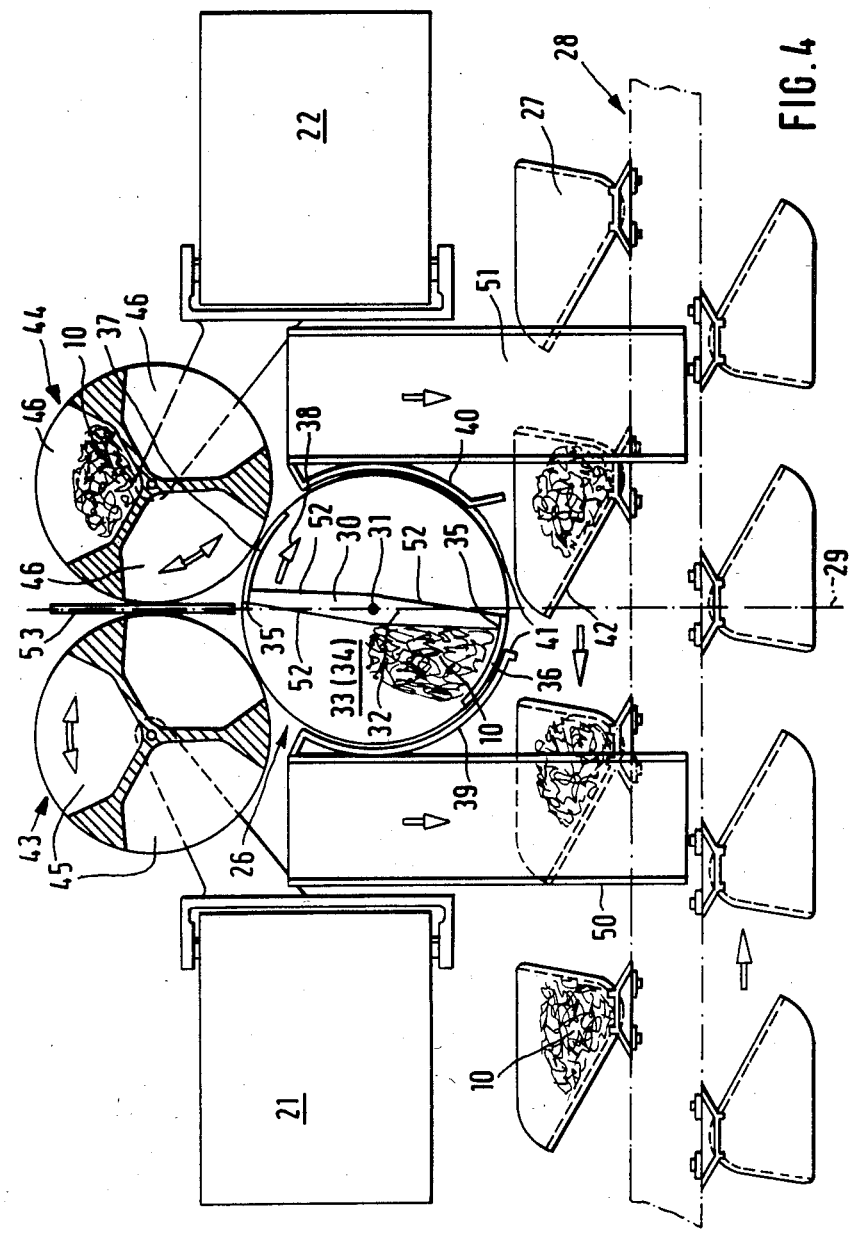

An exemplary embodiment of the invention is explained in more detail below with reference to the drawings in which:

FIG. 1 shows a general view of the apparatus for forming and transporting away tobacco portions, in a front view, FIG. 2 shows a side view or vertical section, offset 90°, of the apparatus according to FIG. 1, FIG. 3 shows a (lower) region of the apparatus with fine-metering devices, tobacco balances, a distributor device and a conveyor, in a front view or vertical section on an enlarged scale, FIG. 4 shows the detail with the distributor device in a view corresponding to FIG. 3, on a further enlarged scale, FIG. 5 shows a representation corresponding to FIG. 4, with the distributor device in a different relative position.

The exemplary embodiment of an apparatus, as illustrated in the drawings, serves for forming and transporting away portions 10 of cut tobacco. This apparatus is located in the form of a disordered, entangled stock of tobacco 11 in a funnel-shaped supply vessel 12. By means of a rotating spiked roller 13 in conjunction with a stripping comb 14 moved in a translational movement, a thin web of tobacco 15 as uniform as possible is first formed on the periphery of the spiked roller 13 and is then conveyed in a downward direction into an essentially vertical tobacco shaft 16. In this, strand of tobacco 17, finally having a relatively homogeneous cross-sectional structure, is formed from the web of tobacco 15 as a result of a form converging in a downward direction and by means of further measures.

The strand of tobacco emerging from the tobacco shaft 16 at the lower end passes into the region of a separating device 18. In this, the individual portions 10 (underweight rough portions) are separated from the strand of tobacco 17, specifically by means of separating combs 19 and 20 FIG. 2 moveable relative to one another and penetrating into the strand of tobacco 17 from the sides.

The predominantly undersize portions 10 are each fed to one of two tobacco balances 21 and 22. The weight of the portion 10 is determined by these. A difference portion 25 determined by the particular tobacco balance 21, 22 is fed to the weighed portion 10 by means of finemetering units 23 and 24 assigned to each tobacco balance, so that this portion has reached the nominal weight (for example, 50 g).

The correctly measured portion 10 is then transferred to a distributor device 26 common to the two tobacco balances 21, 22 and is conveyed from this into a bucket 27 of a bucket chain 28 rotating in a horizontal plane underneath the distributor device 26. The bucket chain 28 is preferably driven continuously.

The common distributor device 26 mounted centrally in relation to a center plane 29 of the apparatus consists essentially of a diametrically extending distributor wall 30. This is driven to rotate about a central axis of rotation 21 extending in the center plane 29. Side walls 33 and 34 in the form of circular surfaces adjoin lateral end walls 32 of the distributor wall 30. Attached to the radially outer longitudinal sides 35 of the distributor wall 30 are retaining walls, in particular retaining plates 36 and 37 in the form of circular arcs. These each extend, flush with the outer peripheral limitation of the side walls 33, 34 in the form of circular arcs in the direction of rotation (the arrow 38) of the distributor device. The retaining plates 36, 37 temporarily carry a portion 10 when the distributor wall 30 is in an appropriate relative position (for example, FIG. 4).

Furthermore, guide plates 39 and 40 arranged fixedly interact with the distributor device 26. These are arranged laterally directly adjacent to the distributor device 26 and are in the form of circular arcs, directly adjacent to the path of movement of the distributor device. The guide plates 39 and 40 extend in a predominantly lateral region of the distributor device 26, in such a way that, together with the latter, they form a closed chamber, in which a portion 1 retained free of loss, is temporarily formed (FIGS. 4 and 5). The guide plates 39, 40 are arranged in such a way and are of such a size that an essentially downward-pointing dropping orifice 41, offset relative to the center plane 29, is formed between these. The larger region of this dropping orifice 41 is located on the side of the center vertical plane 29 rearward in relation to the direction of movement of the bucket chain 28. This ensures that, when the distributor wall 30 is in an appropriate relative position, a portion is conveyed into a bucket 27 moving underneath the distributor device 26.

In the present exemplary embodiment, the distributor wall 30 is designed with a cross-section converging radially outwards. Slightly inclined sliding surfaces 52, on which the portions 10 rest alternately, are obtained as a result. A suitable choice of material (metal) for wall 30 and this particular formation ensure that, when the distributor wall 30 is in an approximate 45° position (FIG. 5), a tobacco portion will slide radially outwards. In the position according to FIG. 5, the portion 10 still rests against the adjacent guide plate 40. However, during the further movement of the distributor wall 30, the portion 10 is exposed to dropping orifice 41 to such an extent that the particular portion 10 passes into the bucket 27 which now stands ready in the appropriate relative position. The retaining plates 36, 37 are always arranged on the side located opposite the dropping side of the distributor wall 30.

The rotary movement of the distributor wall 30 or of the distributor device 26 and the linear conveying movement of the bucket chain 28 are coordinated exactly with one another, in such a way that, during the phase in which a portion 10 is transferred to a bucket 27, the collecting wall 42 of the latter, arranged obliquely in the present case, projects forwards beyond the distributor wall 30 in the conveying direction. During this phase, the latter is in an approximately vertical position. Because of the above-mentioned relative position between the distributor wall 30 and the bucket 27, the fault-free transfer of the portion 10 is guaranteed.

The distributor wall 30, being the essential part of the distributor device 26, makes it a possible for a portion 10 to be received alternately, in practically any relative position, from one of the receptacles 43 and 44 of the tobacco balances 21, 22. In the exemplary embodiment illustrated, the receptacles 43, 44 are designed as star feeders with three cells 45 or 46, each intended for receiving one portion. The particular portion located in the upper cell 45 or 46 is weighed by the tobacco balance 21, 22. In the same position, a difference portion 25 is supplied. After this, the star feeder forming the receptacle 43, 44 is rotated along a partial circle, so that the particular cell 45 or 46 moves downwards (a position directed obliquely downwards), in which position the portion 10 slides out of the particular cell 45 or 46 into the distributor device 26. The receptacles 43, 44 can be driven to rotate in both directions for reasons yet to be explained in detail.

Portions 10 are transferred to the distributor device 26 alternately from one tobacco balance 21, 22 or the other, and in any case never at the same time. In the position shown in FIG. 4, the portion 10 has been transferred from the receptacle 43 shown on the left. To transfer if further to a bucket 10, it is necessary to rotate the distributor wall 30 (the portion 10 also being carried therewith) along a path covering virtually 180°, in particular into a position which has not yet been reached completely in FIG. 5. In the last-mentioned position (45°), the portion 10 slides from one side of the distributor wall 30 to the other. At the same time, the portion 10 slides along on the guide plate 40, until the dropping orifice 41 is reached. An intermediate position is shown in FIG. 3. In this, a portion 10 can also be transferred from the other tobacco balance 22 or receptacle 44 located on the right.

The design and mode of operation of the receptacles 43 and 44 designed as star feeders and belonging to the tobacco balances 21, 22 preferably correspond to the embodiment described in Patent Application P No. 32 26 654.5. In this, an intermediate conveyor 47 is located in front of the receptacles 43, 44 in the conveying direction, in particular lying centrally in relation to the center plane 29. This intermediate conveyor 47 is also designed in the same way as in the apparatus, namely as a star feeder.

The fine-metering units 23, 24 can likewise be designed in accordance with the above mentioned apparatus or, with a slight variation, like the fine-metering units of the apparatus according to U.S. Pat. No. 4,111,212.

As is evident from FIG. 2, the above-mentioned rotating units are mounted on a common vertical supporting plate 48. This is connected in a suitable way to a machine stand. Drive shafts 49 driven to rotate and mounted in the supporting plate are assigned to each rotating device, namely to the intermediate conveyor 47, the receptacles 43 and 44 and the distributor device 26.

In the present exemplary embodiment, in the region where portions 10 are conveyed away, discharge chutes 50 and 51 are arranged fixedly on both sides of the distributor device 26. These are arranged in relation to the receptacles 43, 44 in such a way that any portions conveyed in the lateral or outer cells are transferred to the discharge chutes 50 or 51. These convey away portions 10 which are extremely undersize or overweight because the portion 10 has been separated from the strand of tobacco 17 with corresponding inaccuracy. Underweight portions 10 arise when, as a result of the difference between the actual weight and the nominal weight, the fine-metering units 23, 24 are not designed to supply a relatively large difference portion within a reasonable cycle time. In this case, the particular receptacle 43 or 44 is rotated in the opposite direction, so that the particular cells 45 or 46 come into the receiving range of the discharge chute 50 or 51. As is evident from FIG. 2, the incorrect portion is discharged laterally. In the present exemplary embodiment, the guide plates 39, 40 are arranged on the sides of the discharge chutes 50, 51 facing the distributor device 26.

A further special feature is that, here, a partition wall 53 is located in the vertical center plane 29 between the receptacles 43, 44 designed as star feeders. This partition wall ensures that the portions to be fed to the distributor device from the receptacles 43, 44 are guided into the correct position.

In the present exemplary embodiment, the synchronous movements of the distributor device 26 and the bucket chain 28 are coordinated with one another in such a way that the buckets 27 are filled in succession. One revolution of the distributor device 26 correspond to the movement of the bucket chain 28 from one bucket 27 to the next. In practice, double units are often used for a common bucket chain, that is to say two apparatuses according to FIG. 1 next to one another. In this case, whilst synchronism with the distributor device 26 is maintained, the speed of the bucket chain is increased so that each distributor device feeds every second bucket.

In the exemplary embodiment illustrated, the distributor device 26 is designed so that it has a diameter of approximately 260 mm. The opening angle of the dropping orifice 41 is approximately 50° to 55°.

We claim:

1. An apparatus for forming portions of fibrous material, especially cut tobacco, and for transporting them away; said apparatus comprising:
   a conveyor having upright open receptacles, each for one portion, said conveyor consisting of a bucket chain bearing buckets forming said receptacles,
   a distributor device located above the conveyor, and means for dropping portions sequentially into said distributor device (26),
   the improvement wherein the distributor device (26) comprises a distributor wall (30), means for mounting said distributor wall for rotation about a central transverse axis of rotation (31) perpendicular to the path of movement of said bucket chain (28), means for rotating said distributor wall synchronously with the bucket chain (28), said distributor wall being positioned so as to receive one portion of fibrous material (10) at a time and for transferring this to a bucket (27) after a partial rotation of the distributor wall (30), and wherein the distributor wall (30) is located underneath two feed devices and in line therewith, said feed devices comprising receptacles (43, 44) of tobacco balances (21, 22) for feeding portions (10) alternately onto said distributor wall (30), and wherein said means for rotating said distributor wall (30) comprises means to drive said distributor wall in one direction.

2. An apparatus as claimed in claim 1, wherein said distributor wall (30) has radially outer longitudinal sides (34, 35), and has plane converging sliding surfaces (42) leading from the axis of rotation to opposite radially outer longitudinal sides (34, 35).

3. An apparatus as claimed in claim 2, further comprising retaining plates (36, 37) in the form of parts of circular arcs, respectively adjoining the radially outer longitudinal sides (35) of the distributor wall (30).

4. An apparatus as claimed in claim 3, further comprising circular side walls (33, 34) sandwiching distributor wall (30) and retaining plates 936, 37).

5. An apparatus as claimed in claim 4, further comprising at least one fixed guide plate (39, 40) fixedly mounted adjacent to the path of rotation of distributor wall (30), and forming together with distributor wall (30), retaining plates (36, 37) and side walls (33, 34), continuously opening and closing spaces for temporarily receiving a portion (10) borne by said rotating distributor wall (30).

6. An apparatus as claimed in claim 5, wherein a pair of guide plates (39, 40) are located on respective sides of the distributor device (26) and delimit a dropping orifice (41) for portions (10) below said rotating distributor wall (30).

7. An apparatus as claimed in claim 6, wherein said dropping orifice (41) is offset downstream relative to a vertical center plane (29) of said distributor device (26) in relation to the conveying direction of the bucket chain (28).

8. An apparatus as claimed in claim 1, wherein said distributor wall (30) divides said distributor device (26) into two rotating chambers, said chambers serving alternately for receiving a portion (10), which portion is transferred to bucket chain (28) from the chamber downstream in the conveying direction of the bucket chain.

9. An apparatus as claimed in claim 8 further comprising means for causing said bucket chain (28) to move in a straight line beneath said distributor device (26), each bucket (27) includes a collecting wall (42) extending in a conveying direction of said bucket chain (28), and said synchronizing means comprise means for coordinating operation the distributor wall (30) and said bucket (27) such that said collecting wall (42) of the bucket projects in the conveying direction beyond the end of the distributor wall (30) at the moment wherein said portion is delivered from said collecting wall (42) to the bucket (27).

10. An apparatus as claimed in claim 1, wherein half a revolution of the distributor wall (30) corresponds approximately to a stage of movement of said bucket chain (28) relative to said distributor device (26) from one bucket (27) to the next.

11. An apparatus as claimed in claim 1, wherein said receptacles (43, 44) located above the distributor device (26) constitute star feeders, each star feeder having three allotted cells (45, 46) opening radially outwards for receiving a portion (10) and transferring said portion (10) to said distributor device (26).

12. An apparatus as claimed in claim 11 further comprising a vertical partition (53) within the center plane (29), located above the distributor device 926) and between receptacles (43, 44) for controlling transfer of said portions (10) from said star feeder cells to said distributor device (26) and onto said distributor wall (30).

13. An apparatus as claimed in claim 1 further comprising discharge chutes (50, 51) located underneath each of the receptacles (43, 44) on opposite sides of the distributor device (26) for alternately receiving incorrect portions (10), and means for selectively operating said receptacles (43, 44) to feed correct portions (10) to said distributor device (26) and incorrect portions to said discharge chutes (50, 51).

* * * * *